(12) United States Patent
Tsuihiji

(10) Patent No.: US 9,538,097 B2
(45) Date of Patent: Jan. 3, 2017

(54) IMAGE PICKUP APPARATUS INCLUDING A PLURALITY OF IMAGE PICKUP UNITS AND METHOD OF CONTROLLING THE SAME

(71) Applicant: CANON KABUSHIKI KAISHA, Tokyo (JP)

(72) Inventor: Yuki Tsuihiji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/685,233

(22) Filed: Apr. 13, 2015

(65) Prior Publication Data

US 2015/0296148 A1     Oct. 15, 2015

(30) Foreign Application Priority Data

Apr. 14, 2014   (JP) .................................. 2014-082893

(51) Int. Cl.
| | |
|---|---|
| H04N 5/265 | (2006.01) |
| G06F 17/30 | (2006.01) |
| H04N 5/232 | (2006.01) |
| G06T 11/60 | (2006.01) |

(52) U.S. Cl.
CPC ........ *H04N 5/265* (2013.01); *G06F 17/30265* (2013.01); *G06T 11/60* (2013.01); *H04N 5/23293* (2013.01)

(58) Field of Classification Search
CPC ..... H04N 5/265; H04N 5/23293; G06T 11/60; G06F 17/30265
USPC .................. 348/222.1, 333.01; 382/103, 106
See application file for complete search history.

(56) References Cited

U.S. PATENT DOCUMENTS

2007/0008515 A1*   1/2007   Otani ....................... G01C 3/00
                                                         356/5.02

FOREIGN PATENT DOCUMENTS

JP        2008-177819 A      7/2008

* cited by examiner

*Primary Examiner* — Yogesh Aggarwal
(74) *Attorney, Agent, or Firm* — Cowan, Liebowitz & Latman, P.C.

(57) ABSTRACT

An image pickup apparatus that performs control according to an azimuth detected during photographing, such that a user can enjoy excellent viewing of the synthesized image. A digital camera includes a main camera for obtaining a first image, and an in-camera for obtaining a second image when the first image is obtained. An azimuth sensor and a system controller generate first azimuth information by detecting a photographing direction of the main camera, and generate second azimuth information by detecting a photographing direction of the in-camera. The system controller records the first azimuth information in association with the first image, and the second azimuth information in association with the second image, in a recording medium.

17 Claims, 6 Drawing Sheets

IMAGE PICKUP APPARATUS INCLUDING A PLURALITY OF IMAGE PICKUP UNITS AND METHOD OF CONTROLLING THE SAME

BACKGROUND OF THE INVENTION

Field of the Invention

The present invention relates to an image pickup apparatus including a plurality of image pickup units, and a method of controlling the image pickup apparatus, and more particularly to an image pickup apparatus that performs control according to azimuth when photographing.

Description of the Related Art

In recent years, there has been known an image pickup apparatus, such as a digital camera, as an image processing apparatus. In the image pickup apparatus, as the capacity of a recording medium is increased, it is required that desired image data can be searched for from the recording medium, to thereby enable a user to enjoy efficient image viewing.

In the meanwhile, as a mobile phone or a smartphone, there has been proposed one which is equipped with an image pickup apparatus for photographing an viewer (or a photographer) and an image pickup apparatus for photographing an object, such that the viewer and the object can be recorded at the same time. In such a mobile phone, etc., it is required that an image is efficiently displayed in a viewing direction of a user such that the user can enjoy viewing the image.

For example, there has been disclosed an image pickup apparatus which is configured to control a direction of display of an object image displayed on a display section based on a face image photographed by a digital camera (see Japanese Patent Laid-Open Publication No. 2008-177819). In this image pickup apparatus, the vertical direction of the face image of the user is determined, and according to the determined direction, the direction of display of the object image displayed on the display section is controlled. With this control, the object image is displayed by causing the direction of display of the object image to match the vertical direction of the face image, independently of a posture of the user or how the camera is used or held.

By the way, in the image pickup apparatus disclosed in Japanese Patent Laid-Open Publication No. 2008-177819, although it is described that the direction of display of the object image is controlled according to the vertical direction of a face image, display of a synthesized image obtained by synthesizing the face image and the object image on the display section is not performed. In short, in the image pickup apparatus disclosed in Japanese Patent Laid-Open Publication No. 2008-177819, synthesis and display of the two images is not performed.

Further, when a synthesized image is to be displayed on the display section, adjustment of a direction of display of the synthesized image according to the azimuth of the image pickup apparatus is not performed by the image pickup apparatus disclosed in Japanese Patent Laid-Open Publication No. 2008-177819, either. More specifically, when a synthesized image is displayed on the display section, the image pickup apparatus disclosed in Japanese Patent Laid-Open Publication No. 2008-177819 cannot control a direction of display of the synthesized image according to the azimuth of the image pickup apparatus, which makes it difficult for the user to enjoy excellent viewing of the synthesized image.

SUMMARY OF THE INVENTION

The present invention provides an image pickup apparatus that performs control according to an azimuth detected during photographing, such that a user can enjoy excellent viewing of the synthesized image, and a method of controlling the image pickup apparatus.

In a first aspect of the present invention, there is provided an image pickup apparatus that includes a first image pickup unit for obtaining a first image, and a second image pickup unit for obtaining a second image when the first image is obtained, comprising a generation unit configured to generate first azimuth information by detecting a photographing direction of the first image pickup unit, and generate second azimuth information by detecting a photographing direction of the second image pickup unit, and a recording unit configured to record the first azimuth information in association with the first image, and the second azimuth information in association with the second image, in at least one recording medium.

In a second aspect of the present invention, there is provided an image pickup apparatus that includes a first image pickup unit for obtaining a first image, and a second image pickup unit for obtaining a second image when the first image is obtained, comprising a generation unit configured to generate information indicative of a relative directional relationship between a photographing direction of the first image pickup unit and a photographing direction of the second image pickup unit, and a recording unit configured to record the first image, the second image, and the information indicative of the relative directional relationship, in association with each other, in a recording medium.

In a third aspect of the present invention, there is provided a method of controlling an image pickup apparatus that includes a first image pickup unit for obtaining a first image, and a second image pickup unit for obtaining a second image when the first image is obtained, comprising generating first azimuth information by detecting a photographing direction of the first image pickup unit, and generating second azimuth information by detecting a photographing direction of the second image pickup unit, and recording the first azimuth information in association with the first image, and the second azimuth information in association with the second image, in at least one recording medium.

In a fourth aspect of the present invention, a method of controlling an image pickup apparatus that includes a first image pickup unit for obtaining a first image, and a second image pickup unit for obtaining a second image when the first image is obtained, comprising generating information indicative of a relative directional relationship between a photographing direction of the first image pickup unit and a photographing direction of the second image pickup unit, and recording the first image, the second image, and the information indicative of the relative directional relationship, in association with each other, in a recording medium.

According to the present invention, first azimuth information is recorded in association with a first image in a recording medium, and second azimuth information is recorded in association with a second image in the recording medium. With this configuration, e.g. when a synthesized image is to be displayed on a display section, display of the synthesized image can be controlled according to a relationship between the first azimuth information and the second azimuth information, whereby the user can enjoy excellent viewing of the synthesized image.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
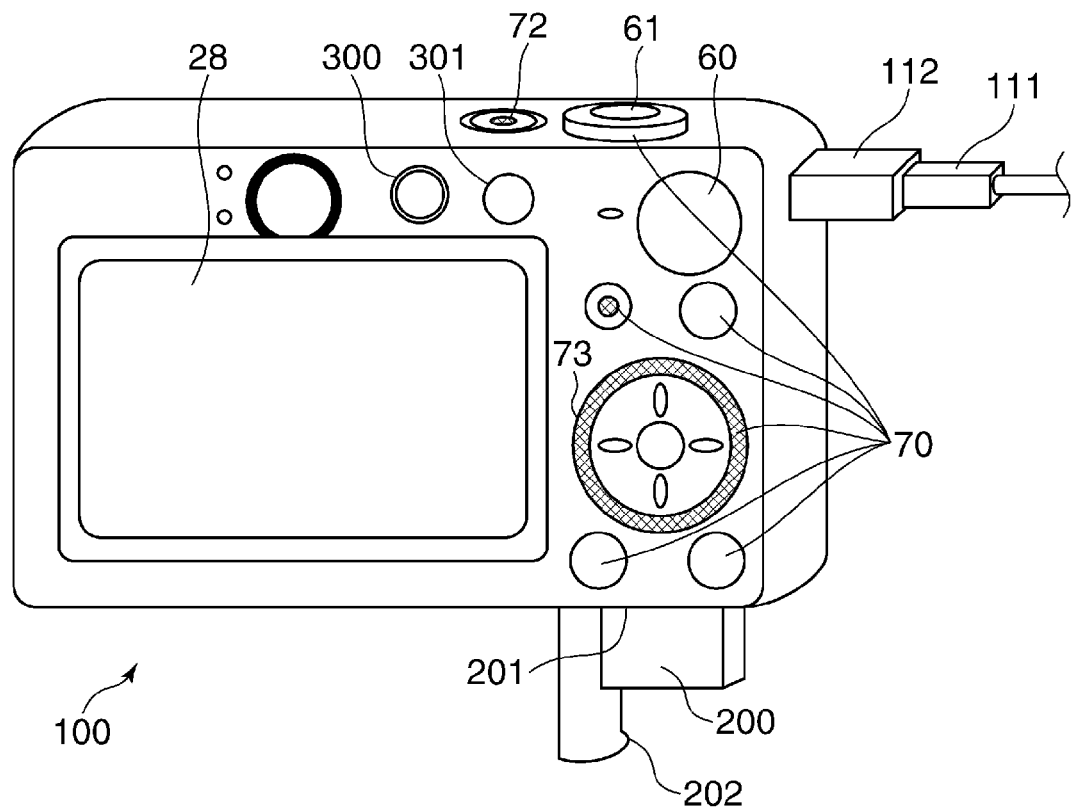
FIG. 1 is a perspective view showing the appearance of an example of an image pickup apparatus according to an embodiment of the present invention.

FIG. 1 is a perspective view showing the appearance of an example of an image pickup apparatus according to an embodiment of the present invention.

The image pickup apparatus appearing in FIG. 1 is a so-called digital camera (hereinafter simply referred to as "the camera") 100, and is capable of photographing a still image and a moving image. A display section 28 is disposed on the rear side of the camera 100, and displays images and various kinds of information. Note that a so-called backlight is mounted on the display section 28 so as to enable a user (photographer or viewer) to view contents displayed on the display section 28 in a dark place.

A power switch 72 for switching between power-on and power-off of the camera and a shutter button 61 are arranged on the top of the camera 100. A mode dial (also referred to as the "mode changing switch") 60 for switching between various modes of the camera 100 and an operating section 70 for receiving various operations from the user are arranged on the right side of the display section 28.

Although not shown in FIG. 1, the camera 100 is provided with a first camera section (first image pickup unit: hereinafter referred to as the "main camera"). The main camera photographs an object (first image pickup). Further, the camera 100 includes a second camera section (second image pickup unit: hereinafter referred to as the "in-camera") 300.

In the illustrated example, the in-camera 300 is disposed immediately above the display section 28 and is directed rearward. That is, the in-camera 300 is disposed on the same surface as the surface where the screen of the display section 28 is disposed, whereby an image of a user side (photographer or viewer), for example, is photographed (second image pickup), as described hereinafter.

The operating section 70 includes various switches, buttons, and a touch panel for receiving various operations from the user. Further, the operating section 70 includes a controller wheel 73. The controller wheel 73 sends a command according to a turning operation by the user. As shown in FIG. 1, the camera 100 includes an azimuth sensor 301, which detects an azimuth (i.e. a photographing direction) as a direction of the main camera when photographing is performed.

In the illustrated example, a connection cable 111 for connecting the camera 100 and an external apparatus (not shown) is connected to the camera 100. The connection cable 111 is connected to the camera 100 by a connector 112.

The camera 100 is formed with a recording medium slot 201, where a recording medium 200, such as a memory card or a hard disk, is accommodated. The recording medium 200 is received into the recording medium slot 201 by opening a lid section 202 formed on the camera 100.

Figure 2:
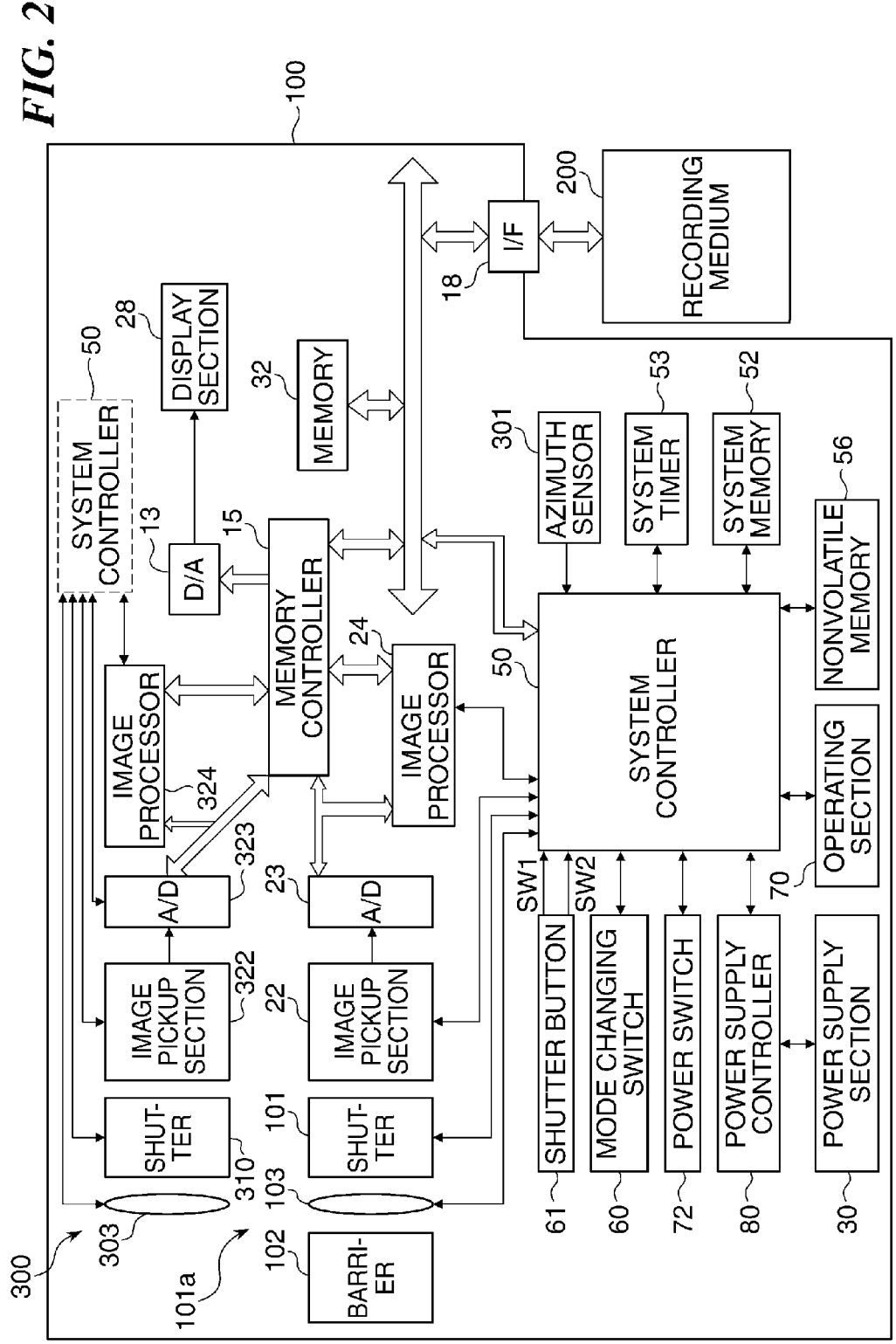
FIG. 2 is a block diagram of a camera appearing in FIG. 1.

FIG. 2 is a block diagram of an example of the camera 100 shown in FIG. 1.

As described above, the camera 100 includes the main camera 101a and the in-camera 300. The main camera 101a is provided with a photographic lens unit (hereinafter simply referred to as the "photographic lens") 103. The photographic lens 103 includes at least a zoom lens and a focus lens.

A shutter 101 having an iris function is disposed downstream of the photographic lens 103. An image pickup section 22 having a CCD or CMOS device, which converts an optical image (object image in the illustrated example) to an electric signal (analog signal), is disposed behind the shutter 101. The analog signal as an output from the image pickup section 22 is converted to a digital signal (image data: hereafter, this image data is referred to as "object image data") by an analog-to-digital converter 23.

Note that a barrier 102 is disposed on a front side of the photographic lens 103. The barrier 102 is used for covering the photographic lens 103, the shutter 101, and the image pickup section 22, to thereby prevent them from being soiled or damaged.

Similarly, the in-camera 300 includes a photographic lens 303, a shutter 310, an image pickup section 322, and an analog-to-digital converter 323. The image pickup section 322 outputs an analog signal according to an optical image (photographer image in the illustrated example). The analog signal as an output from the image pickup section 322 is converted to image data (hereafter, this image data is referred to as "user image data") by the analog-to-digital converter 323.

The above-mentioned object image data (first image) and user image data (second image) are given to image processors 24 and 324, respectively. Further, the object image data and the user image data are directly given to a memory controller 15. Note that in the following description, the object image data and the user image data are sometimes generically simply referred to as "image data".

Processing performed by the image processors 24 and 324 are the same, and hence the following description will be given by referring to the image processor 24.

The image processor 24 receives object image data as an output from the analog-to-digital converter 23, or image data from the memory controller 15, and performs resizing, such as predetermined pixel interpolation and reduction, and color conversion, on the received object image data or image data. Further, the image processor 24 performs predetermined calculation processing using the object image data obtained by image pickup, and a system controller 50 performs exposure control and ranging control based on the calculation results. By performing the above-mentioned controls, AF (Automatic Focus) processing by the TTL (Through The Lens) method, AE (Automatic Exposure) processing, and EF (Electronic Flash pre-emission) processing are performed.

Further, the image processor 24 performs predetermined calculation processing using object image data obtained by image pickup, and performs AWB (Auto White Balance) processing by the TTL method based on the calculation result.

Note that although in the illustrated example, the image processors 24 and 324 are provided in association with the main camera 101a and the in-camera 300, respectively, the image processors 24 and 324 may be configured as one image processor so as to cause the one image processor to perform above-described processing.

The object image data as an output from the analog-to-digital converter 23 is written into a memory 32 via the image processor 24 and the memory controller 15, or directly via the memory controller 15.

Similarly, the user image data as an output from the analog-to-digital converter 323 is written into the memory 32 via the image processor 324 and the memory controller 15, or directly via the memory controller 15. The memory 32 has a sufficient storage capacity to store a predetermined number of still images, or a predetermined duration of a moving image and voice data.

The illustrated memory 32 also serves as an image display memory (video memory). Image data to be displayed, which has been written into the memory 32, is given to the display section 28 via a digital-to-analog converter 13 so as to be displayed as an image.

Note that the display section 28 is implemented by an LCD, for example. Further, by converting image data items accumulated in the memory 32 to analog signals using the digital-to-analog converter 13, and sequentially transferring the analog signals to the display section 28 for display, it is possible to cause the display section 28 to function as an electronic viewfinder, thereby making it possible to perform through image display.

The system controller 50 controls the overall operation of the camera 100. Although in FIG. 2, two system controllers 50 are shown for the purpose of clearly illustrating control lines, actually there is disposed a single system controller 50. In the illustrated example, the system controller 50 as a phantom representation is indicated by a broken-line block.

A nonvolatile memory 56 stores constants, variables, programs, etc., used for the operation of the system controller 50. The programs include programs for executing various processes, described hereinafter. The nonvolatile memory 56 is an electrically erasable and recordable memory, and e.g. an EEPROM (electrically erasable programmable ROM) is used as the nonvolatile memory 56.

A system memory 52 is formed e.g. by a RAM. The system controller 50 reads out constants, variables, programs, etc., from the nonvolatile memory 56, and loads them into the system memory 52.

Note that image data written into the memory 32 is formed into a file by the system controller 50, and is recorded in the recording medium 200 via a recording medium interface 18.

A system timer 53 is connected to the system controller 50. The system timer 53 counts times used in various controls by the system controller 50, and notifies the system controller 50 of the times.

The above-mentioned mode changing switch 60 switches the operation mode of the system controller 50 to one of a still image-recording mode, a moving image-recording mode, a reproduction mode, and so forth.

Examples of the still image-recording mode include an automatic photographing mode, an automatic scene determination mode, a manual mode, various scene modes configured for respective photographic scene types, a program AE mode, and a custom mode. By operating the mode changing switch 60, it is possible to directly change the mode to one of these modes.

Further, after temporarily changing the mode to the still image-recording mode by operating the mode changing switch 60, the mode may be changed to one of the above-mentioned modes using the operating section 70. Similarly, the moving image-recording mode includes a plurality of modes.

When the shutter button 61 is operated halfway (half depressed: photographing preparation instruction), a first shutter switch (not shown) is turned on, whereby a first shutter switch signal SW1 is delivered to the system controller 50. Upon receipt of the first shutter switch signal SW1, the system controller 50 starts operations, such as AF (Auto Focus) processing, AE (Auto Exposure) processing, AWB (Auto White Balance) processing, EF (Electronic Flash pre-emission) processing, and so forth.

When the operation of depressing the shutter button 61 is completed (the shutter button 61 is fully depressed), a second shutter switch (not shown) is turned on, whereby a second shutter switch signal SW2 is delivered to the system controller 50. Upon receipt of the second shutter switch signal SW2, the system controller 50 starts a series of image pickup operations from reading of a signal output from the image pickup sections 22 and 322 to writing of image data in the recording medium 200.

Functions are suitably assigned to various function icons displayed on the display section 28, on a scene-by-scene basis, and when one of the function icons is selectively operated, the operating section 70 acts as the selected function button. Examples of the function buttons include a stop button, a return button, an image scroll button, a jump button, a narrow-down button, and an attribute change button.

When a menu button is operated on the operating section 70, a menu screen for use in configuring various settings is displayed on the display section 28. The user can intuitively configure various settings, using a four-direction button or a set button while viewing the menu screen displayed on the display section 28.

The controller wheel 73 appearing in FIG. 1 is used in combination with the four-direction button e.g. for indicating a selected item. When the controller wheel 73 is turned, an electric pulse signal is generated according to the amount of a turning operation. The system controller 50 controls the camera 100 based on the pulse signal. From the pulse signal, the system controller 50 is capable of knowing an angle to which the controller wheel 73 is turned and the number of rotations of the same.

Note that the controller wheel 73 may be of any type insofar as it is an operation member from which a turning operation can be detected. For example, the controller wheel 73 may be a dial-type operation member which generates a pulse signal according to a turning operation by the user.

Further, the controller wheel 73 may be an operation member formed by a touch sensor, which does not rotate but detects e.g. a turning operation of a user's finger (a so-called touch wheel).

A power supply controller 80 is comprised of a battery detection circuit, a DC-to-DC converter, and a switching circuit for switching between blocks to be energized. The power supply controller 80 detects whether or not a battery is mounted thereon, a type of the battery, and a remaining charge amount of the battery. Further, the power supply controller 80 controls the DC-to-DC converter based on the detection results and an instruction from the system controller 50 to apply predetermined voltage to the sections of the camera 100 including the recording medium 200 for a required time period.

A power supply section 30 is connected to the power supply controller 80. The power supply section 30 includes a primary battery, such as an alkaline battery or a lithium battery, or a secondary battery, such as a NiCd battery, a NiMH battery, or a Li battery, and an AC adapter.

The recording medium interface 18 provides an interface between the camera 100 and the recording medium 200, such as a memory card or a hard disk. The recording medium 200 records image data obtained through photographing. The recording medium 200 is implemented by a semiconductor memory or a magnetic disk.

Note that as shown in FIG. 2, the azimuth sensor 301 is connected to the system controller 50, and the system controller 50 generates azimuth information according to an azimuth detected by the azimuth sensor 301, and performs processing, described hereinafter.

Figure 3:
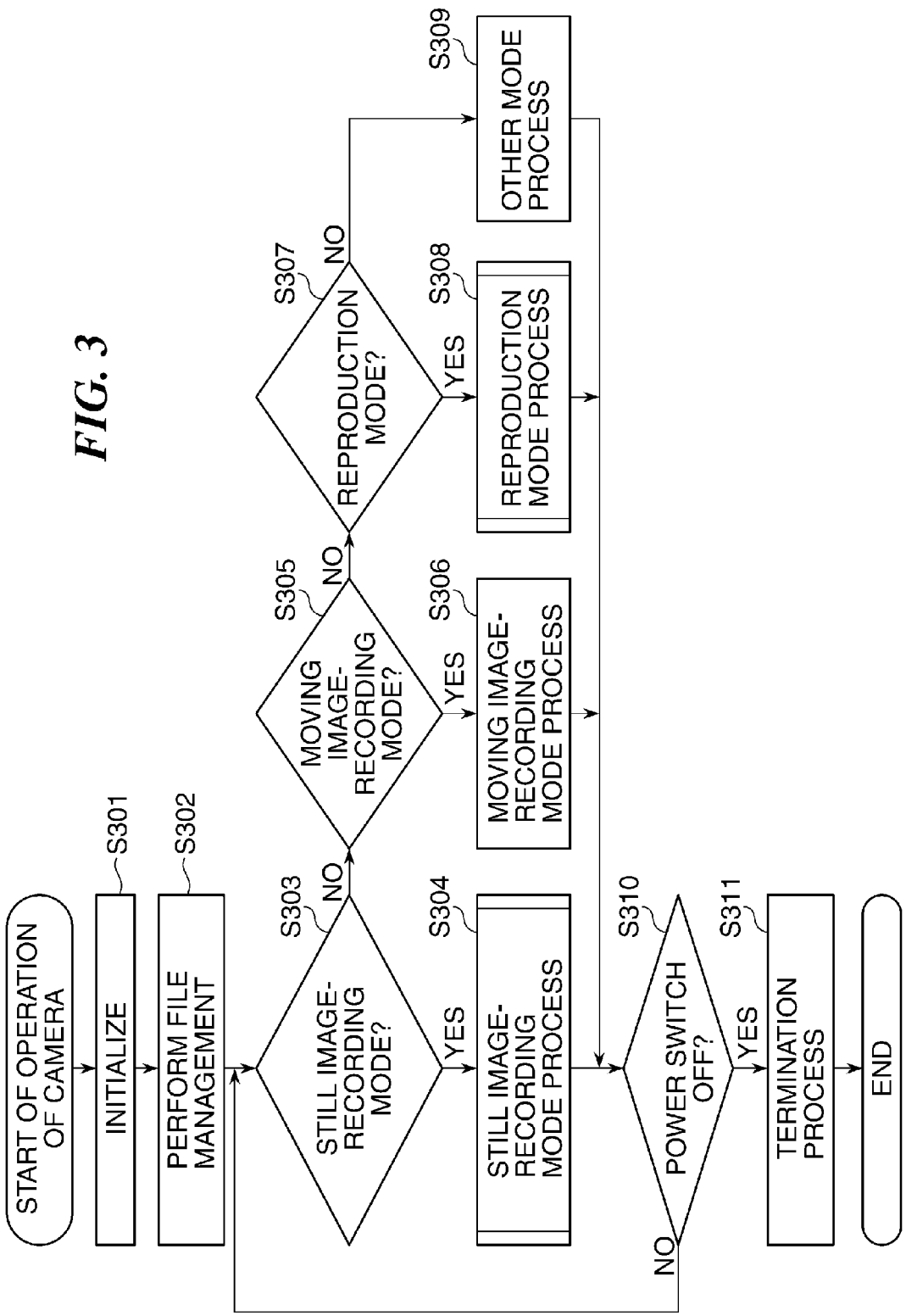
FIG. 3 is a flowchart of a control process for controlling the camera appearing in FIG. 2.

FIG. 3 is a flowchart of a control process for controlling the camera 100 shown in FIG. 2. The control process for controlling the camera 100 is performed by the system controller 50 which loads a program stored e.g. in the nonvolatile memory 56 into the system memory 52 and executes the program.

When the camera 100 is powered on by operating the power switch 72, the system controller 50 performs initialization of flags, control variables, etc (step S301). Then, the system controller 50 performs a management process for managing files recorded in the recording medium 200 (file management process) (step S302).

Next, the system controller 50 determines whether or not the still image-recording mode is set by the mode changing switch 60 (step S303). If the still image-recording mode is set (YES to the step S303), the system controller 50 performs a still image-recording mode process, described hereinafter (step S304).

If the still image-recording mode is not set (NO to the step S303), the system controller 50 determines whether or not the moving image-recording mode is set by the mode changing switch 60 (step S305). If the moving image-recording mode is set (YES to the step S305), the system controller 50 performs a moving image-recording mode process, described hereinafter (step S306).

If the moving image-recording mode is not set (NO to the step S305), the system controller 50 determines whether or not the reproduction mode is set by the mode changing switch 60 (step S307). If the reproduction mode is set (YES to the step S307), the system controller 50 performs a reproduction mode process, described hereinafter (step S308).

If the reproduction mode is not set (NO to the step S307), the system controller 50 performs a mode process for a mode other than the above-mentioned modes (step S309). Examples of the other mode process include a transmission mode process for transmitting a file stored in the recording medium 200, and a reception mode process for receiving a file from an external apparatus and storing the file in the recording medium 200. Each of the other mode processes is selected e.g. from the operating section 70.

After execution of the step S304, S306, S308 or S309, the system controller 50 determines whether or not the camera 100 is powered off by operating the power switch 72 (step S310). If the camera 100 is powered off (YES to the step S310), the system controller 50 performs a termination process (step S311).

The termination process is performed e.g. as follows: The system controller 50 changes display on the display section 28 to a terminated state, and closes the barrier 102 to protect the image pickup section 22. Further, the system controller 50 records parameters and settings including the flags and the control variables, and the set mode, in the nonvolatile memory 56, and cuts off power supply to blocks which do not require power supply. After that, the system controller 50 terminates the operation of the camera 100, and shifts to a power-off state.

Note that if the camera 100 remains powered on (NO to the step S310), the system controller 50 returns to the step S303.

Figure 4:
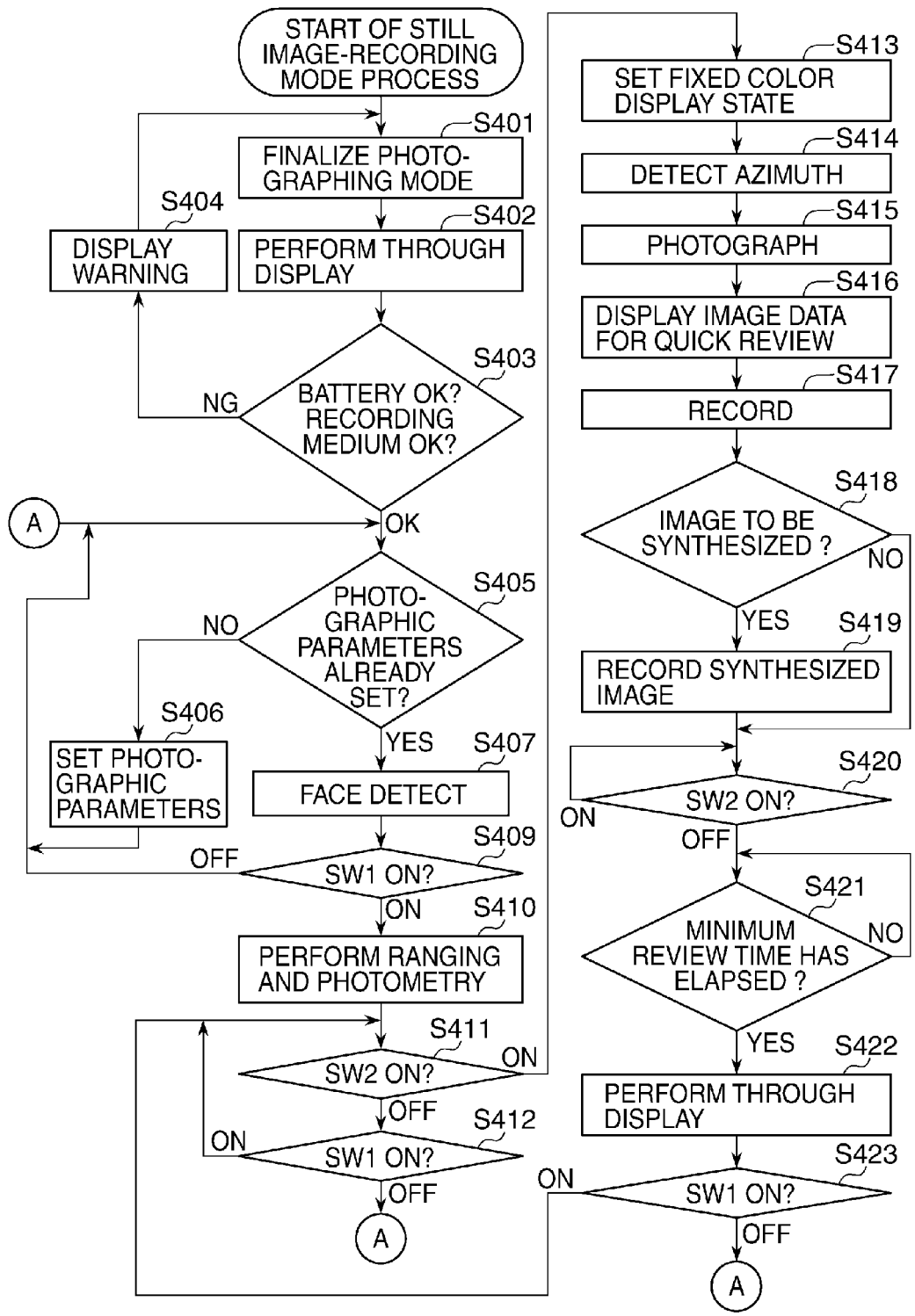
FIG. 4 is a flowchart of a still image-recording mode process performed in a step of the control process shown in FIG. 3.

FIG. 4 is a flowchart of the still image-recording mode process performed in the step S304 in the control process shown in FIG. 3. Note that when the still image-recording mode has been shifted to another mode by the mode changing switch 60 or the power switch 72 is turned off, the system controller 50 terminates the still image-recording mode process by interruption or the like.

When the still image-recording mode is started, first, the system controller 50 finalizes a photographing mode (step S401). Here, the system controller 50 finalizes the photographing mode by acquiring a photographing mode at the time of immediately preceding termination of the still image-recording mode, from the nonvolatile memory 56, and storing the photographing mode in the system memory 52. Note that the photographing mode is a mode for photographing a still image.

By the way, the camera 100 shown in FIG. 2 is provided with the following photographing modes:

Auto mode: a mode in which various parameters of the camera 100 are automatically determined based on an exposure value obtained through photographing, by a program installed in the camera 100.

Manual mode: a mode in which a user can freely change various parameters of the camera 100.

Scene mode: a mode in which a combination of a shutter speed, an aperture value, a strobe light emission state, sensitivity setting, and so forth, which are suitable for a specific type of scene to be photographed, is automatically set.

Examples of the scene mode further include the following modes:

Portrait mode: a mode specialized for photographing a person in a state highlighted against a defocused background.

Night scene mode: a mode specialized for a night scene, in which a strobe light illuminates a person, and the background is recorded at a low shutter speed.

Landscape mode: a mode specialized for a vast landscape scene.

Night & snap mode: a mode suitable for taking a beautiful photo of a night scenery and a person or persons without using a tripod.

Kids & pets mode: a mode that makes it possible to photograph a kid or kids and/or a pet or pets in incessant motion without missing a shutter chance.

Fresh green leaves/red leaves mode: a mode which is suitable to take bright-colored photos of trees and leaves of fresh green or autumn colors.

Party mode: a mode for photographing an object in color tone faithful to the object under fluorescent light or an electric light bulb, while suppressing camera shake.

Snow mode: a mode for photographing a person without darkening the person or with no bluish tone, even against a background of a snowy landscape.

Beach mode: a mode in which a person etc. can be photographed without being darkened even on a sea surface or a sandy beach where reflection of sunlight is strong.

Firework mode: a mode for photographing skyrockets clearly with an optimum exposure.

Aquarium mode: a mode for setting sensitivity, white balance, and color, suitable for photographing fishes, etc., in an indoor water tank.

Under-water mode: a mode for photographing an object in color suppressed in bluish tone, by setting optimum white balance for photographing under water.

Monochrome mode: a mode for photographing an object by selecting a toning color from black-and-white, sepia, blue, purple, green, and so forth.

Vivid color mode: a mode for photographing an object in vivid colors increased in chroma.

Live view mode: a mode which enables a user to select brightness, color, and vividness, in plain language, for creating a picture.

Upon finalization of the photographing mode, the system controller 50 performs through display in which object image data obtained by an output from the image pickup section 22 is displayed on the display section 28 (step S402: image display control). In the through display, object image data obtained by the image pickup section 22 is displayed in real time on the display section 28 as a moving image, without recording the data in the recording medium 200. By viewing a through image thus displayed, a photographer can check an angle of view and determine photographing timing.

Next, the system controller 50 determines whether or not the battery (power supply section) is sufficiently charged (battery OK), and at the same time the recording medium 200 is mounted in the camera 100 (recording medium OK) (step S403). In the step S403, the system controller 50 checks the remaining charge capacity of the power supply section 30 using the power supply controller 80, and determines whether or not the recording medium 200 is mounted and also whether or not the remaining capacity of the recording medium 200 brings about any problem in the operation of the camera 100.

If the battery is not sufficiently charged or if the recording medium 200 is not mounted in the camera 100 (no good (NG) in the step S403), the system controller 50 displays a predetermined warning on the display section 28 and also gives a predetermined warning by voice (step S404). Then, the system controller 50 returns to the step S401.

If the battery is sufficiently charged and the recording medium 200 is mounted in the camera 100 (OK in the step S403), the system controller 50 loads photographic settings which have been stored e.g. in the nonvolatile memory 56 according to user's configuration, into the system memory 52, and determines whether or not photographic parameters have been set (step S405).

If photographic parameters have not been set (NO to the step S405), the system controller 50 sets the camera 100 according to photographic parameters indicative of the photographic settings loaded into the system memory 52 (step S406). Then, the system controller 50 returns to the step S405.

On the other hand, if photographic parameters have been set (YES to the step S405), the system controller 50 performs a face detection process for detecting whether or not there is a human face in an image being displayed as a through image (step S407: face detection).

If a human face is detected in the step S407, the system controller 50 stores the coordinates of the position(s) of the face(s) in the image, the sizes (widths and heights) thereof, the number of the detected faces, reliability coefficients thereof, and so forth, as face detection information, in the system memory 52. Note that if no human face is detected in the image in the step S407, the system controller 50 sets fields of the position coordinates, the sizes (widths and heights), number, the reliability coefficients, and so forth, to 0, in the system memory 52.

Then, the system controller 50 determines whether or not the first shutter switch signal SW1 is ON (step S409: reception of the photographing preparation instruction). If the first shutter switch signal SW1 is OFF (OFF in the step S409), the system controller 50 returns to the step S405.

On the other hand, if the first shutter switch signal SW1 is ON (ON in the step S409), the system controller 50 performs photographing preparation operations, such as ranging and photometry operations (step S410). In the step S410, the system controller 50 focuses the photographic lens 103 on an object by performing ranging processing (auto focus processing), and determines the aperture value and the shutter speed by performing photometry processing (exposure determination processing).

Note that in the photometry processing, setting of a flash is performed, on an as-needed basis. At this time, if a human face has been detected in the step S407, the system controller 50 may perform face AF processing for performing ranging within a range of the detected face.

Next, the system controller 50 determines whether or not the second shutter switch signal SW2 is ON (step S411). If the second shutter switch signal SW2 is OFF (OFF in the step S411), the system controller 50 determines whether or not the first shutter switch signal SW1 is ON (step S412).

If the first shutter switch signal SW1 is OFF (OFF in the step S412), the system controller 50 returns to the step S405. If the first shutter switch signal SW1 is ON (ON in the step S412), the system controller 50 returns to the step S411.

If the second shutter switch signal SW2 is ON (ON in the step S411), the system controller 50 sets the display state of the display section 28 from the through display to a fixed color display state (e.g. whole black display) (step S413). Then, the system controller 50 writes an azimuth detected by the azimuth sensor 301 (azimuth of the main camera 101a: first azimuth information) in the memory 32 (step S414: azimuth detection). Here, the north is used as a reference azimuth.

Then, the system controller 50 performs a photographing process including exposure processing and development processing (step S415). Note that in the exposure processing, object image data as an output from the analog-to-digital converter 23 is written into the memory 32 via the image processor 24 and the memory controller 15, or directly via the memory controller 15.

Further, in the development processing, the system controller 50 performs various processing by reading out image data written into the memory 32, using the memory controller 15, and if required, the image processor 24.

Next, the system controller 50 displays image data obtained by the photographing process, for quick review on the display section 28 (step S416). Note that the term "display for quick review (quick review display)" refers to processing for displaying image data obtained through photographing on the display section 28 for a predetermined time period (review time), for checking purposes, before recording the image data in the recording medium 200.

Then, the system controller 50 performs recording processing for writing the image data obtained by the photographing process (here, object image data) as an image file (i.e. object image file) into the recording medium 200 (step S417). At this time, the system controller 50 records the azimuth detected with reference to the main camera 101a and stored in the memory 32 (the first azimuth information), as metadata, in the object image file.

Next, the system controller 50 determines whether or not synthesis for synthesizing the object image data obtained by the main camera 101a and user image data obtained by the in-camera 300 has been set (step S418). Note that whether or not to synthesize images is set by the user using the operating section 70.

If the synthesis has been set (YES to the step S418), the system controller 50 synthesizes the object image data and the user image data, and records image data obtained by the synthesis in the recording medium 200 as synthesized image data (step S419). Then, the system controller 50 determines whether or not the second shutter switch signal SW2 remains ON (step S420).

If the second shutter switch signal SW2 remains ON (ON in the step S420), the system controller 50 waits. At this time, the system controller 50 continues the above-described quick review display. That is, after performing the recording processing in the step S417, the system controller 50 continues performing the quick review display on the display section 28 until the second shutter switch signal SW2 turns off.

This enables the user to check the image carefully through the quick review display, by continuing a fully-depressed state of the shutter button 61. Note that if the synthesis has not been set (NO to the step S418), the system controller 50 directly proceeds from the step S418 to the step S420.

If the second shutter switch signal SW2 is OFF (OFF in the step S420), i.e. if the user releases the fully-depressed state of the shutter button 61, the system controller 50 determines whether or not the review time set in advance for the quick review display (minimum review time) has elapsed (step S421). If the minimum review time has not elapsed (NO to the step S421), the system controller 50 waits for the minimum review time to elapse.

On the other hand, if the minimum review time has elapsed (YES to the step S421), the system controller 50 causes the display state of the display section 28 to return from the quick review display state to the through display state (step S422).

By this processing, after the user has checked the image using the quick review display, the display state of the display section 28 is automatically switched to the through display state in which object image data is sequentially displayed for next photographing.

Next, the system controller 50 determines whether or not the first shutter switch signal SW1 is ON (step S423). If the first shutter switch signal SW1 is ON (ON in the step S423), the system controller 50 proceeds to the step S411 to determine whether or not the second shutter switch signal SW2 is ON. On the other hand, if the first shutter switch signal SW1 is OFF (OFF in the step S423), the system controller 50 returns to the step S405.

As described above, in a case where the half depressed state of the shutter button 61 continues (the first shutter switch signal SW1 is ON), the system controller 50 proceeds to the step S411 in preparation for next photographing.

On the other hand, in a released state of the shutter button 61 (the first shutter switch signal SW1 being OFF), the system controller 50 terminates a series of photographing operations, and returns to the step S405 to shift to a photographing standby state.

Figure 5:
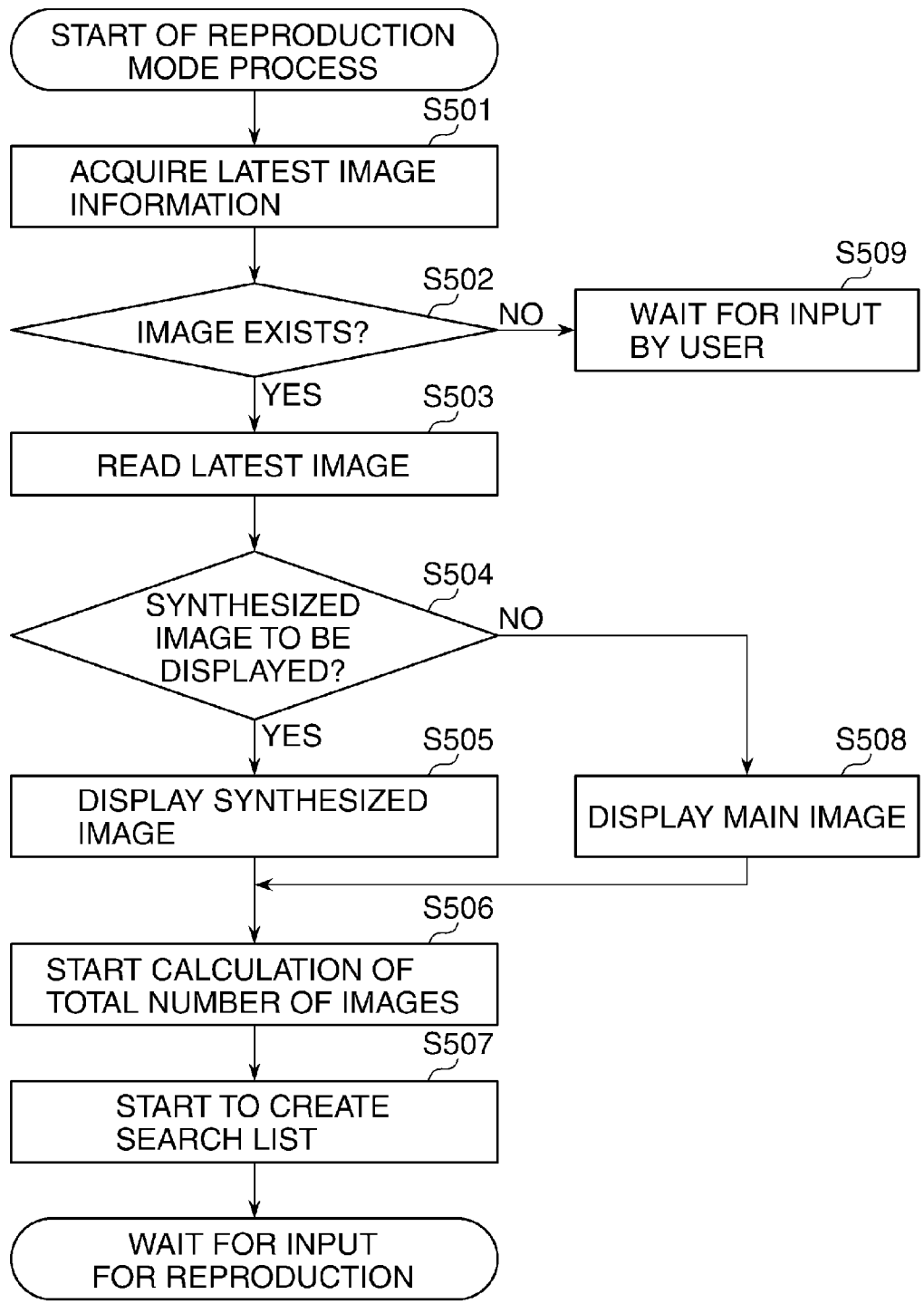
FIG. 5 is a flowchart of a reproduction mode process performed in a step of the control process shown in FIG. 3.

FIG. 5 is a flowchart of the reproduction mode process performed in the step S308 in the control process shown in FIG. 3.

When the reproduction mode process is started by a user's operation, the system controller 50 acquires latest image information from the recording medium 200 (step S501). The acquisition of the latest image information is performed earlier than calculation of the total number of image data items and creation of a search list. This is advantageous in that image display can be performed immediately after the start of the reproduction mode process.

Next, the system controller 50 determines whether or not the latest image information could be properly acquired. That is, the system controller 50 determines whether or not there is an image file in the recording medium 200 (step S502). If it is determined in the step S502 that there is no image file in the recording medium 200, the system controller 50 determines that latest image information could not be acquired.

Further, also in a state in which it is impossible to acquire image information from the recording medium 200 due to a defect thereof, the system controller 50 determines that the latest image information could not be acquired. In other words, if at least one image file exists in an acquirable state in the recording medium 200, the system controller 50 determines that the latest image information could be acquired.

If the latest image information could not be acquired (NO to the step S502), the system controller 50 determines that there is no image file in the recording medium 200, and waits for input by the user (step S509). On the other hand, if the latest image information could be acquired (YES to the step S502), the system controller 50 reads latest image data (i.e. object image data) from the recording medium 200 according to the latest image information (step S503). At this time, the system controller 50 reads user image data associated with the latest object image data (i.e. user image data paired with the object image data) from the recording medium 200.

Then, the system controller 50 determines whether or not to display the synthesized image data recorded in the recording medium 200 on the display section 28 (step S504). Note that whether or not to display the synthesized image data is determined according to a user's operation.

Figure 6:
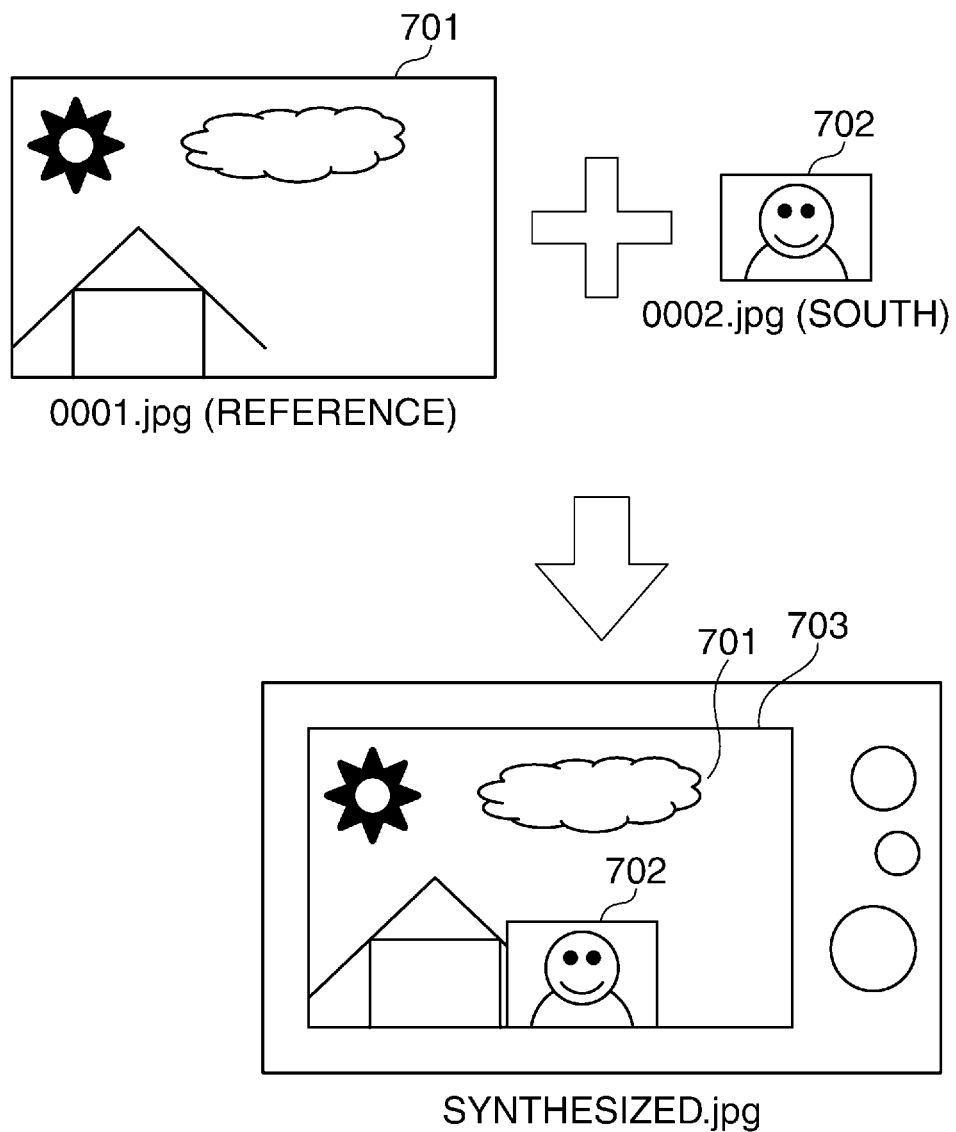
FIG. 6 is a diagram useful in explaining display of a synthesized image, which is performed by the camera shown in FIG. 2.

FIG. 6 is a diagram useful in explaining display of the synthesized image data, which is performed by the camera appearing in FIG. 2.

If it is determined that the synthesized image data is to be displayed (YES to the step S504), the system controller 50 displays the synthesized image data 703 obtained by synthesizing the object image data 701 and the user image data 702, as a synthesized image on the display section 28. More specifically, the system controller 50 displays an image corresponding to the object image data 701 and an image corresponding to the user image data 702 on the same screen. At this time, the system controller 50 corrects the synthesized image such that the user can view the same easily, as described hereinafter (step S505).

On the other hand, if it is determined that the synthesized image data is not to be displayed (NO to the step S504), the system controller 50 displays an image photographed by the main camera 101a, i.e. an image corresponding to the object image data as a main image on the display section 28 (step S508).

As described hereinabove, the azimuth detected with reference to the main camera 101a is recorded as metadata in the object image file, i.e. the object image data. In the example illustrated in FIG. 6, when displaying the synthesized image data 703 obtained by synthesizing the object image data 701 and the user image data 702 on the display section 28, the system controller 50 displays the synthesized image data 703 on the display section 28 by referring to the azimuth (metadata) recorded in the object image data. Here, it is determined in which direction the in-camera 300 is directed with respect to the direction of the main camera 101*a*, i.e. the azimuth, and information on the determined direction (azimuth) of the in-camera 300 (second azimuth information) is stored in the memory 32.

In the example illustrated in FIG. 1, the in-camera 300 is always directed in a direction opposite to the direction of the main camera 101*a*, so that e.g. if the object image data 701 was obtained with the main camera 101*a* directed to the north, the user image data was obtained with the in-camera 300 directed to the south.

When displaying the synthesized image data 703 on the display section 28, the system controller 50 displays the synthesized image data 703 by associating the azimuth of the main camera 101*a* (first azimuth information) and the azimuth of the in-camera 300 (second azimuth information), which are stored in the memory 32. Here, since the main camera 101*a* and the in-camera 300 are in an opposite-direction relationship (i.e. the main camera is directed to the north but the in-camera is directed to the south), the system controller 50 displays the user image data in the center at a lower-side area of a screen on which the object image data is displayed in such a manner that the user image data is superimposed on the object image data. At this time, although not shown, the system controller 50 displays the azimuth of the main camera 101*a* detected when the object image data was acquired (here, the north), on the screen.

This makes it possible for the user to easily know the azimuth of the in-camera 300 detected when the user image data was acquired (here, the south).

In the example illustrated in FIG. 1, although the in-camera 300 is fixed, the direction of the in-camera 300 may be changeable. For example, the display section 28 may be configured as a member the direction of which can be changed with respect to the camera 100, and the in-camera 300 may be provided on the member (display section 28). When the direction of the in-camera 300 is changeable, the system controller 50 always grasps the relationship between the direction of the in-camera 300 and the azimuth of the main camera 101*a*. More specifically, by adding a member for detecting a relative directional relationship between the main camera and the in-camera, the CPU can calculate the azimuth of the in-camera 300 based on the azimuth of the main camera 101*a* and the above-mentioned relative directional relationship (not shown in FIG. 1).

The azimuth information of the in-camera 300 (second azimuth information) is recorded e.g. in attribute information of image data (Exif (Exchangeable image file format) information). An image obtained by the main camera 101*a* and an image obtained by the in-camera 300 may be recorded as separate files. In this case, the azimuth information of the main camera 101*a* (first azimuth information) is recorded in the image obtained by the main camera 101*a*, and the azimuth information of the in-camera 300 (second azimuth information) is recorded in the image obtained by the in-camera 300. Note that both the azimuth information of the main camera 101*a* and the azimuth information of the in-camera 300 may be recorded in each of the above-mentioned two image files.

Then, the system controller 50 changes the display position of the image corresponding to the user image data on the screen according to the relationship between the direction of the in-camera 300 and the azimuth of the main camera 101*a*.

Note that when the direction of the in-camera 300 is changeable, the user as a photographer is not always photographed, but the in-camera 300 is sometimes directed to the same direction as the direction of the main camera 101*a*. Further, the in-camera 300 is sometimes directed to a direction different from the direction of the main camera 101*a* to photograph another object.

For example, when the main camera 101*a* is directed to the north, if the in-camera 300 is directed to the east, the system controller 50 displays an image obtained by the in-camera 300 in the center in a right-side area of the screen.

As described heretofore, the system controller 50 displays an image obtained by the in-camera 300 at an end of the screen according to a positional relationship between the main camera 101*a* and the in-camera 300, with reference to the azimuth of the main camera 101*a*, in such a manner that the image obtained by the in-camera 300 is superimposed on an image obtained by the main camera 101*a*.

More specifically, the system controller 50 displays an image obtained by the in-camera 300 with reference to the azimuth of the main camera 101*a* detected by the azimuth sensor 301 (i.e. 0°). At this time, a center in a right-side area of the screen is set to 90°, and a center in a lower-side area of the screen is set to 180°, and a center in a left-side area of the screen is set to 270°. The azimuth of the main camera 101*a* is displayed in a center in an upper-side area of the screen. This makes it possible for the user to easily know the directions of the main camera 101*a* and the in-camera 300 when performing photographing.

Note that when the main camera 101*a* and the in-camera 300 are directed in the same direction, the system controller 50 displays an image obtained by the in-camera 300 independently on the display screen without superimposing the image on an image obtained by the main camera 101*a*.

After execution of the step S505 or S508, the system controller 50 starts a total number acquisition process for acquiring the total number of image data items recorded in the recording medium 200 (step S506). Note that since the step S506 is executed in the background, the system controller 50 can proceed to the next step without waiting for completion of the step S506.

This makes it possible for the user to, even when it takes time to calculate the total number of image data items in a state in which a large number of the image data items are recorded in the recording medium 200, view images without waiting for completion of the calculation of the total number.

The total number acquisition process (total number calculation process) is particularly effective in a case where e.g. when the still image-recording mode process has shifted to the reproduction mode process, if a difference occurs in the total number of image data items due to recording of new image data or deletion of recorded image data during the still image-recording mode process. If there is no recording of new image data or deletion of recorded image data during the still image-recording mode process, there is no need to calculate the total number of image data items since it is required to use the total number of image data items, which has already been calculated.

Next, the system controller 50 starts to create a search list (search list creation process) (step S507). The search list is a list for acquiring in advance and managing attribute information imparted to image data. By creating the search list in advance, it is possible to quickly perform processing, such as reproduction or deletion, according to each attribute information.

Similarly to the total number calculation process, the search list creation process in the step S507 is performed in the background, and hence it is possible to perform the next step without waiting for completion of the search list creation process. After performing the step S507, the system controller 50 waits for an operation input from the user. That is, the system controller 50 waits for an operation input from the user according to the search list.

Note that the system controller 50 may map a position where the object image data was acquired in a map, display a synthesized image together with the map on the display section 28. At this time, the system controller 50 displays the synthesized image on the display section 28 by associating a reference azimuth (azimuth of the main camera 101*a*) with an azimuth shown on the map.

As described hereinabove, in the present embodiment, when an image obtained by the main camera 101*a* and an image obtained by the in-camera 300 are synthesized and displayed, display of the synthesized image is controlled according to a positional relationship between the main camera 101*a* and the in-camera 300, i.e. according to the azimuths of them, so that the user can enjoy excellent viewing of the synthesized image.

Note that although the azimuth information of the main camera 101*a* and the azimuth information of the in-camera 300, described above, are recorded as metadata (attribution information) of the image files, this is not limitative, but the azimuth information may be recorded in a so-called maker note. Further, the azimuth information associated with the image obtained by the main camera 101*a* may be recorded according to Exif, while the azimuth information associated with the image obtained by the in-camera 300 may be recorded in a maker note (maker note portion) of attribution information of an image file recording the synthesized image.

Further, information indicative of a relative directional relationship between the main camera and the in-camera may be recorded in the image file. The image obtained by the main camera 101*a*, the image obtained by the in-camera 300, and further the information indicative of the relative directional relationship may be associated with each other and recorded as a file, in the recording medium. By controlling image display based on the information indicative of the relative directional relationship, it is possible to perform such display as described with reference to FIG. 6.

More specifically, in a case where a relative difference between the azimuths of the main camera 101*a* and the in-camera 300 is small with reference to a photographing direction of the main camera, the image obtained by the in-camera 300 may be disposed at an upper-side area of the screen; in a case where the relative difference is large or the in-camera 300 is directed in a direction substantially opposite to the direction of the main camera 101*a*, the image obtained by the in-camera 300 may be disposed at a lower-side area of the screen; and in a case where the relative difference is at a medium level, the image obtained by the in-camera 300 may be disposed at a right-side area or a left-side area of the screen. Whether the image obtained by the in-camera 300 is to be disposed at the right-side area or the left-side area may be determined according to a predetermined rule by analyzing the relative difference between the azimuths.

As is apparent from the above description, in the example illustrated in FIG. 2, the azimuth sensor 301 and the system controller 50 function as a generation unit, and the system controller 50 functions as a recording unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2014-082893 filed Apr. 14, 2014 which is hereby incorporated by reference herein in its entirety.

What is claimed is:

1. An image pickup apparatus that includes a first image pickup unit for obtaining a first image, and a second image pickup unit for obtaining a second image when the first image is obtained, comprising:

a generation unit configured to generate first azimuth information by detecting a photographing direction of the first image pickup unit, and generate second azimuth information by detecting a photographing direction of the second image pickup unit; and a recording unit configured to record the first azimuth information in association with the first image, and the second azimuth information in association with the second image, in at least one recording medium, wherein the second image pickup unit is configured to be capable of changing the photographing direction with respect to the first image pickup unit, and wherein the second image pickup unit is disposed in a display unit a direction of which can be changed with respect to the image pickup apparatus.

2. The image pickup apparatus according to claim 1, wherein said generation unit generates the second azimuth information by correcting the first azimuth information based on a positional relationship between the first image pickup unit and the second image pickup unit.

3. The image pickup apparatus according to claim 1, wherein when the first image and the second image are displayed on the same screen, the first azimuth information and the second azimuth information are displayed on the same screen.

4. The image pickup apparatus according to claim 1, wherein when the first image and the second image are displayed on the same screen, the first image and the second image are displayed in a positional relationship dependent on a relationship between the first azimuth information and the second azimuth information.

5. The image pickup apparatus according to claim 1, wherein said recording unit records a synthesized image obtained by synthesizing the first image and the second image, in the recording medium.

6. The image pickup apparatus according to claim 5, wherein the second azimuth information is recorded in a maker note portion of attribution information of an image file recording the synthesized image.

7. The image pickup apparatus according to claim 1, further comprising a display control unit configured to control an arrangement of the first image and the second image based on the information indicative of the relative directional relationship, when the first image and the second image are displayed on the same screen.

8. The image pickup apparatus according to claim 1, further comprising a recording unit configured to record the first image, the second image, and the information indicative of the relative directional relationship, in association with each other, in a recording medium.

9. An image pickup apparatus that includes a first image pickup unit for obtaining a first image, and a second image pickup unit for obtaining a second image when the first image is obtained, comprising:
a generation unit configured to generate first azimuth information by detecting a photographing direction of the first image pickup unit, and generate second azimuth information by detecting a photographing direction of the second image pickup unit; and
a recording unit configured to record the first azimuth information in association with the first image, and the second azimuth information in association with the second image, in at least one recording medium,
wherein said generation unit generates the second azimuth information by correcting the first azimuth information based on a positional relationship between the first image pickup unit and the second image pickup unit.

10. The image pickup apparatus according to claim 9, wherein when the first image and the second image are displayed on the same screen, the first azimuth information and the second azimuth information are displayed on the same screen.

11. The image pickup apparatus according to claim 9, wherein when the first image and the second image are displayed on the same screen, the first image and the second image are displayed in a positional relationship dependent on a relationship between the first azimuth information and the second azimuth information.

12. The image pickup apparatus according to claim 9, wherein said recording unit records a synthesized image obtained by synthesizing the first image and the second image, in the recording medium.

13. The image pickup apparatus according to claim 12, wherein the second azimuth information is recorded in a maker note portion of attribution information of an image file recording the synthesized image.

14. The image pickup apparatus according to claim 9, further comprising a display control unit configured to control an arrangement of the first image and the second image based on the information indicative of the relative directional relationship, when the first image and the second image are displayed on the same screen.

15. The image pickup apparatus according to claim 9, further comprising a recording unit configured to record the first image, the second image, and the information indicative of the relative directional relationship, in association with each other, in a recording medium.

16. A method of controlling an image pickup apparatus that includes a first image pickup unit for obtaining a first image, and a second image pickup unit for obtaining a second image when the first image is obtained, comprising:
generating first azimuth information by detecting a photographing direction of the first image pickup unit, and generating second azimuth information by detecting a photographing direction of the second image pickup unit; and
recording the first azimuth information in association with the first image, and the second azimuth information in association with the second image, in at least one recording medium,
wherein the second image pickup unit is configured to be capable of changing the photographing direction with respect to the first image pickup unit, and
wherein the second image pickup unit is disposed in a display unit a direction of which can be changed with respect to the image pickup apparatus.

17. A method of controlling an image pickup apparatus that includes a first image pickup unit for obtaining a first image, and a second image pickup unit for obtaining a second image when the first image is obtained, comprising:
generating first azimuth information by detecting a photographing direction of the first image pickup unit, and generating second azimuth information by detecting a photographing direction of the second image pickup unit; and
recording the first azimuth information in association with the first image, and the second azimuth information in association with the second image, in at least one recording medium,
wherein said second azimuth information is generated by correcting the first azimuth information based on a positional relationship between the first image pickup unit and the second image pickup unit.

* * * * *